(12) United States Patent
Corcoran et al.

(10) Patent No.: US 8,085,119 B2
(45) Date of Patent: Dec. 27, 2011

(54) FLEXIBLE ELECTROMAGNETIC VALVE ACTUATOR MODELING AND PERFORMANCE

(75) Inventors: Christopher J. Corcoran, Newton, MA (US); Andrew M. Wright, Cambridge, MA (US); David B. Cope, Medfield, MA (US)

(73) Assignee: Engineering Matters Inc., Medfield, MA (US)

( * ) Notice: Subject to any disclaimer, the term of this patent is extended or adjusted under 35 U.S.C. 154(b) by 695 days.

(21) Appl. No.: 12/267,920

(22) Filed: Nov. 10, 2008

(65) Prior Publication Data

US 2009/0121558 A1    May 14, 2009

Related U.S. Application Data

(60) Provisional application No. 60/986,445, filed on Nov. 8, 2007.

(51) Int. Cl.
*H01F 7/00* (2006.01)
*F01L 9/04* (2006.01)
(52) U.S. Cl. ........ 335/229; 335/234; 335/259; 335/267; 123/90.11
(58) Field of Classification Search .......... 335/229–234, 335/259, 267; 251/129.09–129.1; 123/90.11
See application file for complete search history.

(56) References Cited

U.S. PATENT DOCUMENTS

| 4,779,582 | A | * | 10/1988 | Lequesne | 123/90.11 |
|---|---|---|---|---|---|
| 5,847,480 | A | | 12/1998 | Post | |
| 6,876,284 | B2 | * | 4/2005 | Wright et al. | 335/229 |
| 7,352,268 | B2 | * | 4/2008 | Wright et al. | 335/229 |
| 7,800,470 | B2 | * | 9/2010 | Wright et al. | 335/229 |
| 2001/0017490 | A1 | | 8/2001 | Suzuki et al. | |
| 2002/0190582 | A1 | | 12/2002 | Denne | |
| 2003/0030779 | A1 | | 2/2003 | Hara | |
| 2003/0052548 | A1 | | 3/2003 | Hol et al. | |

OTHER PUBLICATIONS

Image from PPT presentation, Corcoran Engineering, Apr. 2001, re: (Linear) Halbach Array magnet Configuration.

* cited by examiner

*Primary Examiner* — Ramon Barrera
(74) *Attorney, Agent, or Firm* — Hayes Soloway P.C.

(57) ABSTRACT

The system contains a first planar permanent magnet having a first direction of magnetization and a first opening formed therein. A second planar permanent magnet has a second direction of magnetization and a second opening formed therein. The second opening is axially aligned with the first opening. The direction of magnetization of the first planar permanent magnet opposes the direction of magnetization of the second planar permanent magnet. A plurality of stationary coils are provided, wherein at least one of the stationary coils is located within the first opening and at least one of the stationary coils is located within the second opening. A pair of extension members traverses the first opening and the second opening. A magnetizable slug is integral with each of the extension members.

20 Claims, 4 Drawing Sheets

200

```
┌─────────────────────────────────────────────────────┐
│  A first planar permanent magnet is axially aligned with a  │
│  second planar permanent magnet, wherein the first planar   │
│  permanent magnet and the second planar permanent magnet    │
│             have opposing magnetization.                    │
│                         202                                 │
└─────────────────────────────────────────────────────┘
                            │
┌─────────────────────────────────────────────────────┐
│   A metal plate is located between the first planar permanent │
│       magnet and the second planar permanent magnet          │
│                         204                                  │
└─────────────────────────────────────────────────────┘
                            │
┌─────────────────────────────────────────────────────┐
│  A first coil is positioned within a first opening of the first planar │
│    permanent magnet and a second coil is positioned within a           │
│       second opening of the second planar permanent magnet             │
│                            206                                         │
└─────────────────────────────────────────────────────┘
                            │
┌─────────────────────────────────────────────────────┐
│   A pair of valve extensions are positioned traversing the first │
│      opening and the second opening , wherein each valve         │
│   extension is integral with at least one slug at least partially │
│       within at least one of the first coil and the second coil   │
│                            208                                    │
└─────────────────────────────────────────────────────┘
                            │
┌─────────────────────────────────────────────────────┐
│  At least one coil is energized, generating a reluctance force │
│   that causes at least one of the slugs to slide along an axis of │
│                          the coils                               │
│                           210                                    │
└─────────────────────────────────────────────────────┘
```

FIG. 4

FLEXIBLE ELECTROMAGNETIC VALVE ACTUATOR MODELING AND PERFORMANCE

CROSS-REFERENCE TO RELATED APPLICATION

This application claims priority to copending U.S. Provisional Application entitled, "FLEXIBLE ELECTROMAGNETIC VALVE ACTUATOR MODELING AND PERFORMANCE," having Ser. No. 60/986,445, filed Nov. 9, 2007, which is entirely incorporated herein by reference.

FIELD OF THE INVENTION

The present invention is generally related to actuators and more particularly is related to electromagnetic valve actuators.

BACKGROUND OF THE INVENTION

Operation of the gas exchange valves is crucial to efficient operation of the internal combustion engine. Traditional fixed camshaft operation of the valves amounts to a one-size-fits-all approach to valve actuation, representing a static compromise over the engine operating conditions, particularly load and speed. Multi-step camshafts are improvements which offer distinct cam profiles employed as the engine operating conditions change. Mechanical cam phasing approaches significantly offer timing variations of the valve operations, but utilize the same cam profile. Other valve control approaches have also been undertaken. Specific valve actuation strategies, including Early Intake Valve Closing, Late Intake Valve Closing, Late Intake Valve Opening, and Variable Max Valve Lift, have been experimentally shown to improve engine performance.

A fully flexible valve actuation is needed that can take advantage of various actuation strategies. Toward that end, a number of electromagnetic valve actuators have been patented by the inventors of the present design. Each design has generally been investigated as a single valve actuator. However, the limited spatial volume available for installing a single valve actuator on an engine head is a challenging constraint. For multi-valves per cylinder, installing two closely adjacent non-interfering actuators is even more challenging. Thus, a heretofore unaddressed need in the art exists.

SUMMARY OF THE INVENTION

Embodiments of the present invention provide a system and method for providing a double valve actuator. Briefly described, in architecture, one embodiment of the system, among others, can be implemented as follows. The system contains a first planar permanent magnet having a first direction of magnetization and a first opening formed therein. A second planar permanent magnet has a second direction of magnetization and a second opening formed therein. The second opening is axially aligned with the first opening. The direction of magnetization of the first planar permanent magnet opposes the direction of magnetization of the second planar permanent magnet. A plurality of stationary coils are provided, wherein at least one of the stationary coils is located within the first opening and at least one of the stationary coils is located within the second opening. A pair of extension members traverses the first opening and the second opening. A magnetizable slug is integral with each of the extension members.

The present invention can also be viewed as providing methods for utilizing a double valve actuator. In this regard, one embodiment of such a method, among others, can be broadly summarized by the following steps: axially aligning a first planar permanent magnet with a second planar permanent magnet, wherein the first planar permanent magnet and the second planar permanent magnet have opposing magnetization; locating a metal plate between the first planar permanent magnet and the second planar permanent magnet; positioning a first coil within a first opening of the first planar permanent magnet and a second coil within a second opening of the second planar permanent magnet; positioning a pair of extension members, each extension member traversing the first opening and the second opening, wherein each extension member is integral with at least one slug at least partially within at least one of the first coil and the second coil; and energizing at least one coil generating a reluctance force that causes at least one of the slugs to slide along an axis of the coils.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 4 is a flow chart illustrating a method of utilizing the double valve actuator apparatus of FIG. 1, in accordance with a first exemplary embodiment of the present invention.

DETAILED DESCRIPTION

Figure 1:
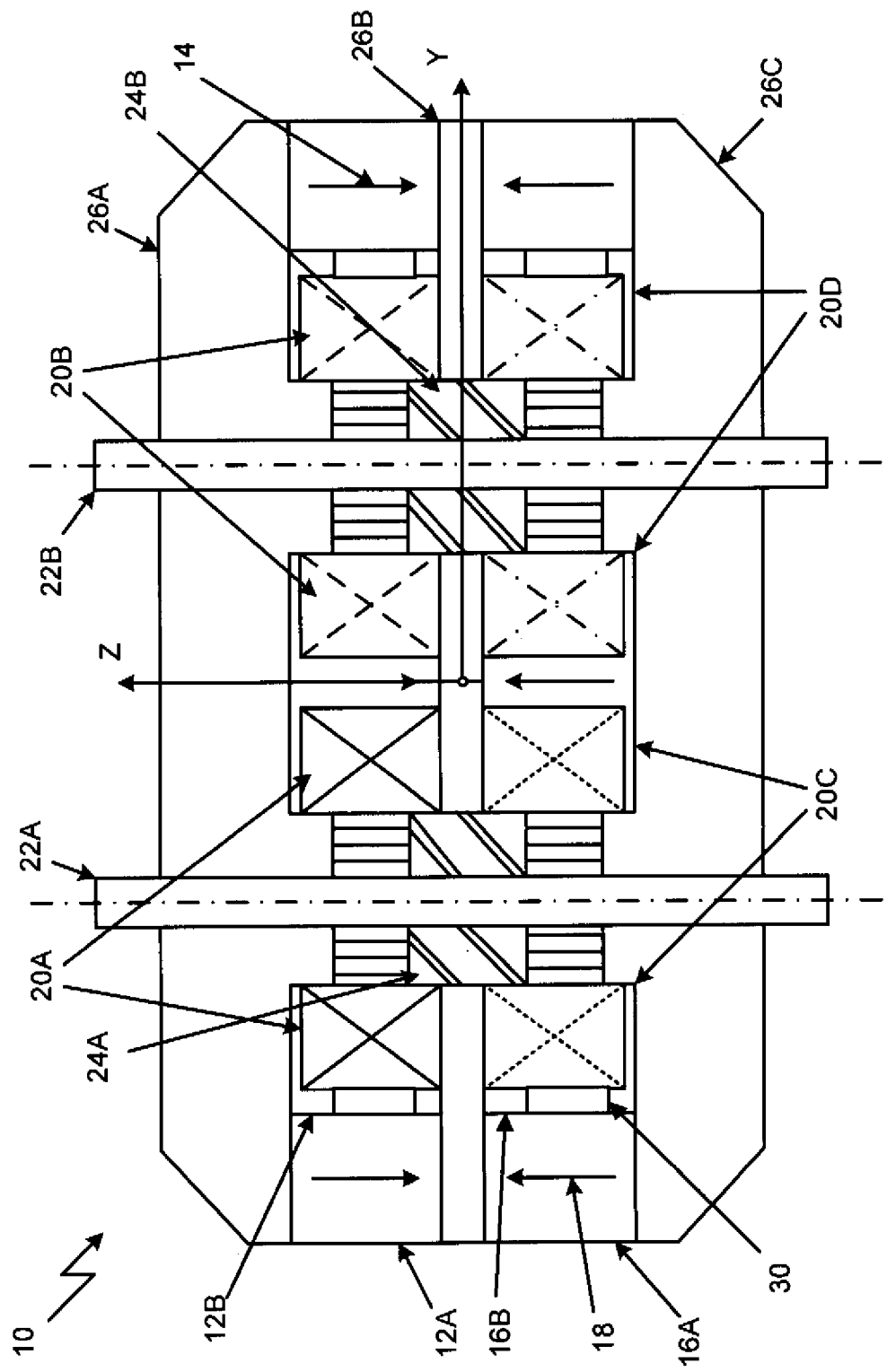
FIG. 1 is a cross-sectional illustration of the double valve actuator apparatus, in accordance with a first exemplary embodiment of the present invention.
Figure 2:
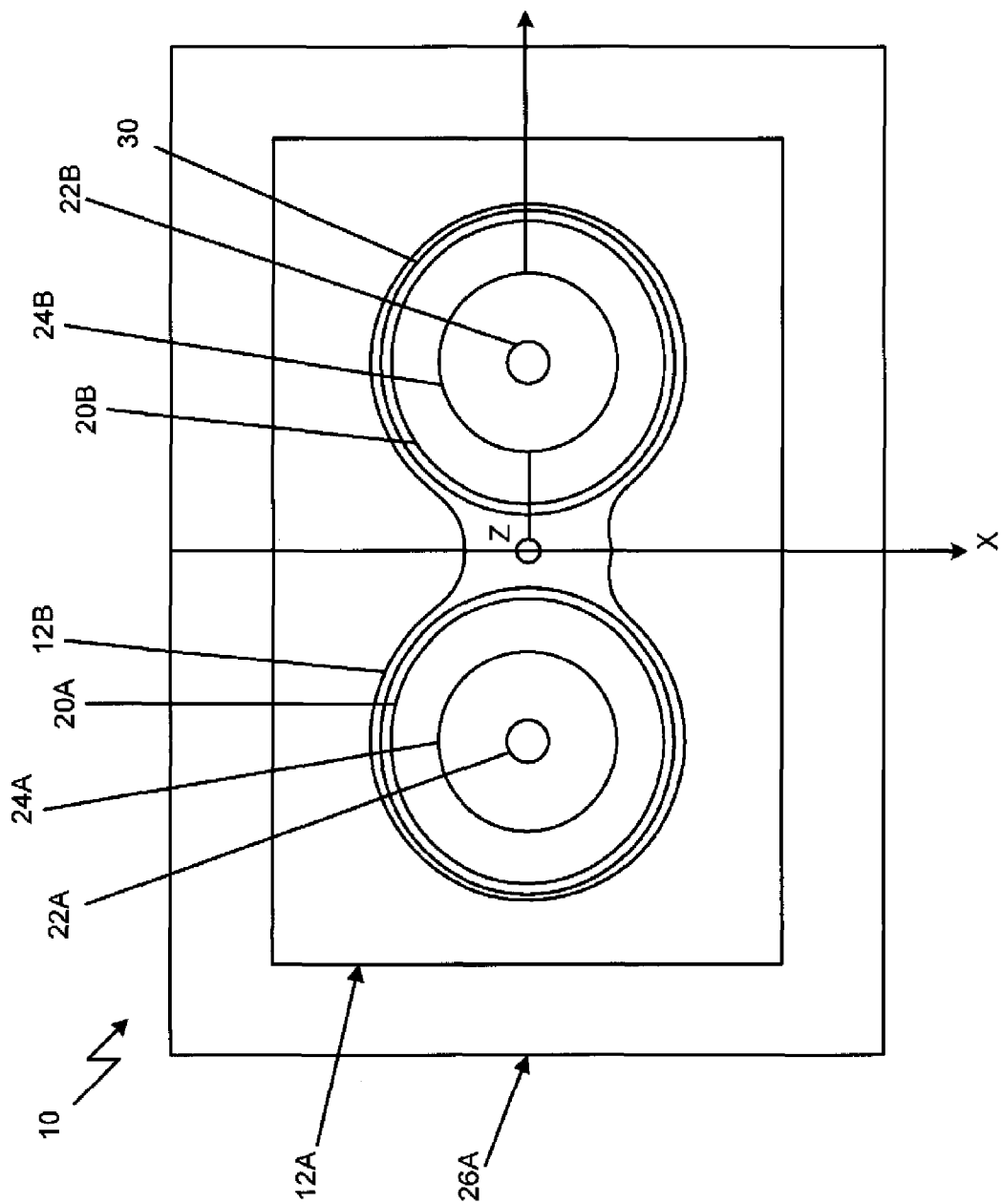
FIG. 2 is a top illustration of the double valve actuator apparatus of FIG. 1, in accordance with the first exemplary embodiment of the present invention.

FIG. 1 is a cross-sectional illustration of the double valve actuator apparatus 10, in accordance with a first exemplary embodiment of the present invention. FIG. 2 is a top illustration of the double valve actuator apparatus 10 of FIG. 1, in accordance with the first exemplary embodiment of the present invention. The double valve actuator apparatus 10 contains a first planar permanent magnet 12A having a first direction of magnetization 14 and a first opening 12B formed therein. A second planar permanent magnet 16A has a second direction of magnetization 18 and a second opening 16B formed therein. The second opening 16B is axially aligned with the first opening 12B. The direction of magnetization 14 of the first planar permanent magnet 12A opposes the direction of magnetization 18 of the second planar permanent magnet 16A. A magnitude of the magnetization 14 of the first planar permanent magnet 12A may be equivalent to a magnitude of the magnetization 18 of the second planar permanent magnet 16A. A plurality of stationary coils 20A, 20B, 20C, 20D are provided, wherein at least one of the stationary coils 20A, 20B is located radially within the first opening 12B and at least one of the stationary coils 20C, 20D is located within the second opening 16B. A pair of extension members 22A, 22B traverses the first opening 12B and the second opening 16B. A magnetizable slug 24A, 24B is integral with each of the extension members 22A, 22B.

As shown in FIG. 1, the first opening 12B and the second opening 16B may be in the form of a 'figure 8'. Other shapes of openings, including, but not limited to, ovals, rectangles, separate circular openings, or other geometric shapes may be available. Some opening shapes may create gaps or voids that are not occupied by coils 20A, 20B, 20C, 20D, extension members 22A, 22B, slugs 24A, 24B, or other elements. Within these voids, additional magnets may be inserted to enhance the forces created in part by the permanent magnets 12A, 16A. These additional magnets may have magnetizations similar to the permanent magnets 12A, 16A at least in that an additional magnet in the first opening 12B may have a magnetization opposing that of an additional magnet in the second opening 16B. The magnets 12A, 16A may have a rectangular prism shape with the openings 12B, 16B formed therein. The top stationary coils 20A, 20B may be controlled independently or in tandem. The bottom stationary coils 20C, 20D may be controlled independently or in tandem. It should be noted that "top" and "bottom" as utilized herein is from the perspective of FIG. 1, and is not intended to suggest any type of directional requirement on the double valve actuator apparatus 10.

As shown in FIG. 1, the double valve actuator apparatus 10 may include at least one metal plate 26B between the first planar permanent magnet 12A and the second planar permanent magnet 16A. Further, metal plates 26A, 26B may be located on opposing sides of the first planar permanent magnet 12A and metal plates 26B, 26C may be located on opposing sides of the second planar permanent magnet 16A. As shown in FIG. 1, the outer metal plates 26A, 26C may have extended portions that fit within each of the stationary coils 20A, 20B, 20C, 20D. Also, as shown in FIG. 1, the outer metal plates 26A, 26C may be chamfered or otherwise shaped on the outer perimeter.

The double valve actuator apparatus 10 may include ferromagnetic material 30 disposed between the stationary coils 20A, 20B, 20C, 20D and the openings 12A, 12B, 16A, 16B. The ferromagnetic material 30, as shown in FIG. 1 need not have a height similar to the stationary coils 20A, 20B, 20C, 20D, although it may. The ferromagnetic material 30 may be, for instance, low carbon steel. The ferromagnetic material 30 may be useful for increasing a force applied to the slugs 24A, 24B when the stationary coils 20A, 20B, 20C, 20D are initiated. The slugs 24A, 24B may also be formed with at least one ferromagnetic material. Further, while FIG. 2 shows the ferromagnetic material 30 along a circumference of the stationary coils 20A, 20B, 20C, 20D, the ferromagnetic material 30 may also be placed only around a portion of the circumference of the stationary coils 20A, 20B, 20C, 20D. A pair of secondary elements may be integral with the extension members 22A, 22B and cooperative with a separate device. The secondary elements may be valves for an engine. Movement of the secondary elements may at least partially actuate the separate device.

Figure 3:
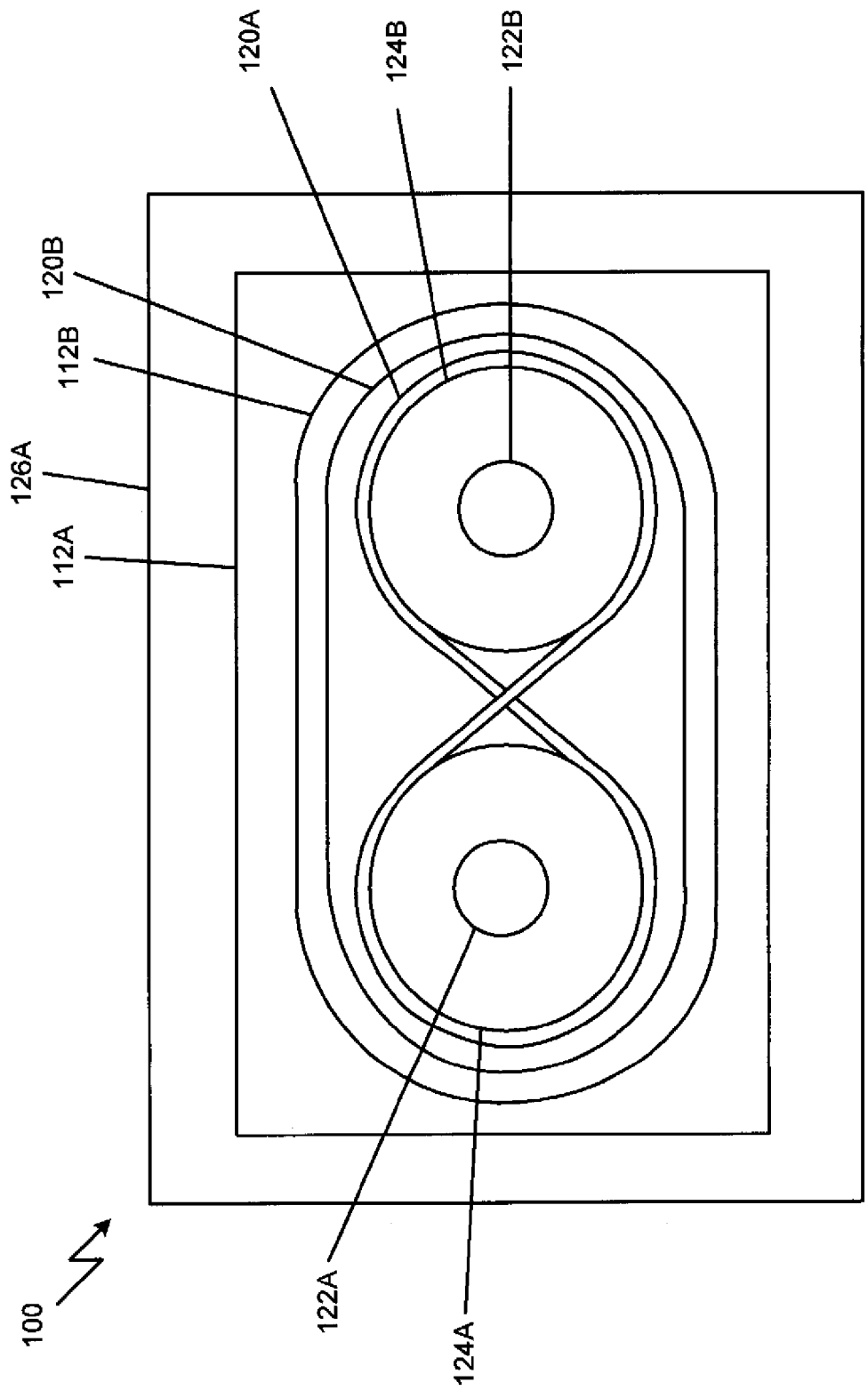
FIG. 3 is a top illustration of a double valve actuator apparatus, in accordance with a second exemplary embodiment of the present invention.

FIG. 3 is a top illustration of a double valve actuator apparatus 100, in accordance with a second exemplary embodiment of the present invention. Similar to the first exemplary embodiment, the second exemplary embodiment includes a first planar permanent magnet 112A having a first direction of magnetization and a first opening 112B formed therein. A second planar permanent magnet (not shown), beneath the first planar permanent magnet 112A has a second direction of magnetization and a second opening formed therein. The second opening is axially aligned with the first opening 112B. The direction of magnetization of the first planar permanent magnet 112A opposes the direction of magnetization of the second planar permanent magnet. A pair of stationary coils are provided, wherein at least one of the stationary coils 120A is located within the first opening 112B and at least one of the stationary coils (not shown) is located within the second opening. A pair of extension members 122A, 122B traverses the first opening 112B and the second opening. A magnetizable slug 124A, 124B is integral with each of the extension members 122A, 122B. Metal plates 126A may be located on opposing sides of the first planar permanent magnet 112A and metal plates may be located on opposing sides of the second planar permanent magnet.

In comparison with FIG. 2, FIG. 3 shows a modification wherein the stationary coils 120A are wound differently. In FIG. 2, the stationary coils 20A, 20B are independent coils. In FIG. 3, there is a racetrack configuration for the stationary coil 120B commonly encompassing both slugs 124A, 124B and a figure-8 stationary coil 120A differentiatingly encompassing both slugs 124A, 124B. That is, the racetrack coil 120B applies the same current-turns around each slug 124A, 124B; the figure-8 coil 120A applies positive current-turns around one slug 124A and negative current-turns around the other slug 124B (dependent on the direction of the current). The racetrack coil 120B may occupy roughly 90% of the available coil volume while the figure-8 coil 120A may occupy the remaining 10% of volume. This arrangement will allow each slug 124A, 124B to have a flux supplied by the superposition of the racetrack and figure-8 coils 120A, 120B excitations.

FIG. 4 is a flowchart 200 illustrating a method utilizing the double valve actuator apparatus 10 of FIG. 1, in accordance with a first exemplary embodiment of the present invention. It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 202, a first planar permanent magnet 12A is axially aligned with a second planar permanent magnet 16A, wherein the first planar permanent magnet 12A and the second planar permanent magnet 16A have opposing magnetization 14, 18. A metal plate 26B is located between the first planar permanent magnet 12A and the second planar permanent magnet 16A (block 204). A first coil 20A, 20B is positioned within a first opening 12B of the first planar permanent magnet 12A and a second coil 20C, 20D is positioned within a second opening 16B of the second planar permanent magnet 16A (block 206). A pair of extension members 22A, 22B are positioned traversing the first opening 12B and the second opening 16B, wherein each extension member 22A, 22B is integral with at least one slug 24A, 24B at least partially within at least one of the first coil 20A, 20B and the second coil 20C, 20D (block 208). At least one coil 20A, 20B, 20C, 20D is energized, generating a reluctance force that causes at least one of the slugs 24A, 24B to slide along an axis of the coils 20A, 20B, 20C, 20D (block 210).

A physical barrier or something comparable may be placed along the first or second opening 12B, 16B to maintain at least one of the slugs 24A, 24B between the stationary coils 20A, 20B, 20C, 20D.

The stationary coils 20A, 20B, 20C, 20D may each be independently controlled. The stationary coils 20A, 20B, 20C, 20D may be hard wired together so that they are collectively initiated with a single control. Pairs of the coils 20A, 20B, 20C, 20D may be hard wired together so that they are collectively initiated with two controls. Also, the controls may be configured such that the stationary coils 20A, 20B, 20C, 20D may be independently operable, but controlled jointly. One having ordinary skill in the art will recognize there are several arrangements possible for initiating the double valve actuator 10, depending on the purpose of actuation, and each arrangement is considered to be within the scope of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. An actuator apparatus, comprising:
   a first planar permanent magnet having a first direction of magnetization and a first opening formed therein;
   a second planar permanent magnet having a second direction of magnetization and a second opening formed therein, wherein the second opening is axially aligned with the first opening, and wherein the direction of magnetization of the first planar permanent magnet opposes the direction of magnetization of the second planar permanent magnet;
   a plurality of stationary coils, wherein at least a first stationary coil is located within the first opening and wherein at least a second stationary coil is located within the second opening;
   a pair of extension members, each extension member traversing the first opening and the second opening; and
   a pair of magnetizable slugs, each slug integral with one of the extension members.

2. The apparatus of claim 1, further comprising a metal plate separating the first planar permanent magnet and the second planar permanent magnet.

3. The apparatus of claim 1, further comprising metal plates on opposing sides of each of the permanent magnets.

4. The apparatus of claim 1, further comprising ferromagnetic material disposed between the stationary coils and the magnets.

5. The apparatus of claim 1, wherein the openings further comprise an oval shape.

6. The apparatus of claim 1, wherein the first coil and the second coil each form approximately a figure-8 shape.

7. The linear actuating device of claim 1, wherein the planar permanent magnets are substantially rectangular prisms.

8. The apparatus of claim 1, further comprising at least two separate coils within each of the first planar permanent magnet and the second planar permanent magnet.

9. The apparatus of claim 1, wherein the extension members further comprise:
   a pair of shafts, each shafts integral with one of the slugs, each of the shafts slidable within the openings formed in the magnets; and
   a pair of secondary elements, each secondary element integral with one of the shafts and cooperative with a separate device, whereby movement of at least one of the secondary elements at least partially actuates the separate device.

10. The apparatus of claim 1, wherein a magnitude of the magnetization of the top magnet is substantially similar to a magnitude of the magnetization of the bottom magnet.

11. A method of utilizing a linear actuating device, the method comprising the steps of:
    axially aligning a first planar permanent magnet with a second planar permanent magnet, wherein the first planar permanent magnet and the second planar permanent magnet have opposing magnetizations;
    locating a metal plate between the first planar permanent magnet and the second planar permanent magnet;
    positioning a first coil within a first opening of the first planar permanent magnet and a second coil within a second opening of the second planar permanent magnet;
    positioning a pair of extension members, each extension member traversing the first opening and the second opening, wherein each extension member is integral with at least one slug at least partially within at least one of the first coil and the second coil; and
    energizing at least one coil generating a force that causes at least one of the slugs to slide along an axis of the coils.

12. The method of claim 11, further comprising the step of restraining at least one of the slugs within the first coil and second coil.

13. The method of claim 12, wherein the step of restraining at least one of the slugs further comprises the step of attaching a first end cap at least proximate to the first planar permanent magnet and a second end cap at least proximate to the second planar permanent magnet, thereby physically impeding at least one of the slugs from moving beyond the coils.

14. The method of claim 13, further comprising the step of focusing the force with at least one of the end caps.

15. The method of claim 11, further comprising actuating an engine valve integral with the slug.

16. The method of claim 11, wherein the openings further comprise an oval shape.

17. The method of claim 11, wherein the first planar permanent magnet and the second planar permanent magnet are substantially rectangular prisms.

18. The method of claim 11, further comprising the steps of:
    sliding at least one of the extension member integral with one of the slugs; and
    actuating a secondary element, wherein the secondary element is integral with at least one of the extension members and cooperative with a separate device, whereby movement of the secondary element at least partially actuates the separate device.

19. The method of claim 11, wherein a magnitude of the magnetization of the top magnet is substantially similar to a magnitude of the magnetization of the bottom magnet.

20. The method of claim 11, further comprising the step of sliding both extension members concurrently.

* * * * *